Oct. 20, 1970 YUJI SASAKI ET AL 3,535,208

TEMPERATURE GRADIENT SHAKING INCUBATOR

Filed April 18, 1968

INVENTOR.
YUJI SASAKI
YOSHIRO OKAMI
BY Rupert J. Brady
ATTORNEY

3,535,208
TEMPERATURE GRADIENT SHAKING INCUBATOR
Yuji Sasaki, Hokkaido, and Yoshiro Okami, Tokyo, Japan, assignors to Zaidan Hojin Biseibutsu Kagaku Kenkyu Kai, Tokyo, Japan, a corporation of Japan
Filed Apr. 18, 1968, Ser. No. 722,234
Int. Cl. C12b 1/00
U.S. Cl. 195—140      4 Claims

ABSTRACT OF THE DISCLOSURE

This invention relates to a temperature gradient shaking incubator which consists of a rectangular box the front wall of which is provided with several holes at transversely equal intervals along the face thereof and both side walls of which are provided with liquid inlets and outlets respectively, said box being sectionalized into two triangular chambers by a partition wall having holes therethrough aligned with the holes of the front wall, said chambers adapted to have liquids of properly controlled different temperature respectively circulated therethrough. Through the registered holes of the front wall and partition wall pipes are connected which extend into both chambers and which are adapted to be filled with a required amount of liquid and equipped with annular air tight stoppers in their free openings, and tubes containing substances to be tested being fixedly inserted into the pipes through the stoppers.

---

The present invention relates to an incubator, in particular to a temperature gradient shaking incubator by which various different temperatures may be provided at the same time in a single operation.

Temperature has a very important effect upon growth, propagation and physiological properties of living microorganisms and also upon enzymic and other chemical reactions. It is very important to determine each optimum temperature for the above described matters.

Hitherto, the optimum temperature has been determined by using a number of incubators at different temperature or a single incubator in which the temperature is changed time after time succesively to observe reactions, growth or the like, at the different temperatures. The former procedure requires great expense and extensive space and the latter requires a considerable amount of time and troublesome labor to make a series of observations.

An object of the present invention is to eliminate the above mentioned disadvantages and to provide a temperature gradient shaking incubator by which various different temperatures may be provided at the same time in one operation so that the optimum incubator temperature can be determined in a short time without extensive space.

According to the present invention, the temperature gradient shaking incubator consists of a rectangular box of proper dimension which is constructed to be shaken on a proper shaking device, in front and rear along an arc, and the front wall of which is provided with several holes of suitable dimension at transversely equal intervals and both side walls of which are provided with liquid inlets and outlets respectively. The box is sectioned into two triangular chambers by a partition wall which is also provided with holes aligned or registered with the holes provided in the front wall, and which is vertically fixed in the box on its diagonal line. Through these aligned holes of the front wall and partition wall pipes are airtightly inserted into the box. The free openings of the pipes outside the box are provided with proper annular packing material such as annular gum stoppers through which tubes with proper stopper or cotton tap are fixedly inserted so as to extend into the pipes.

When the incubator of the present invention is used to determine the optimum temperature, controlled liquids are circulated in the separate chambers through the inlets and outlets respectively by any suitable circulating system and the pipes are filled with a required amount of liquid while the tubes are also filled with a required amount of liquid reactant or nutrient medium.

Figure 1:
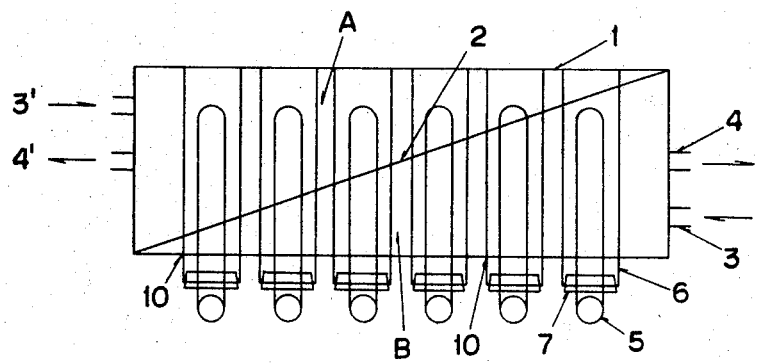
FIG. 1 is a schematic plan view of the incubator in its operating condition, the top wall being removed.
Figure 2:
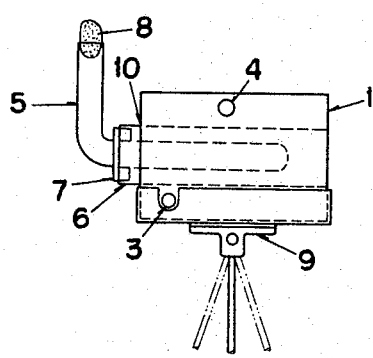
FIG. 2 is a side elevation view thereof.
Figure 3:
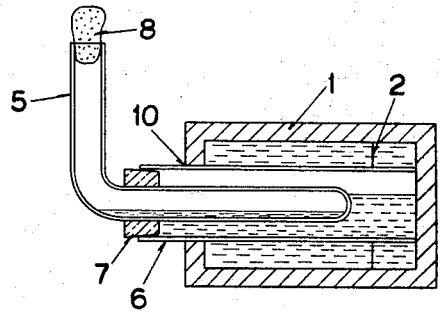
FIG. 3 is a cross sectional side view of the box arranged with an L-shaped culture tube.
Figure 4:
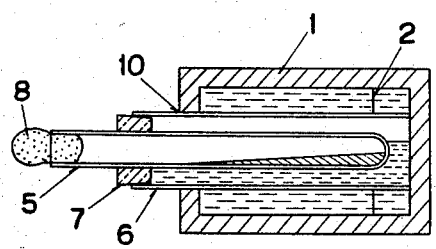
FIG. 4 is a cross sectional side view of the box arranged with the usual tubes for solid culture.

In the drawing, the shaking incubator of the present invention consists of a rectangular box 1 of desired dimensions. The front wall of the box is provided with several, for example, six holes 10 at transversely equal intervals. Both side walls are equipped respectively with inlets 3, 3' and outlets 4, 4'. Each inlet and outlet in each side wall are respectively connected by a flexible conduit to a thermostat having a suitable liquid circulating mechanism such as a pump, not shown. The box 1 is sectioned into two triangular chambers A and B by a partition wall 2 which is vertically fixed in the box on its diagonal line and by extending between two diagonally opposite corner portions of the box is provided with the same number of holes as the front wall, such as six holes. These holes are aligned with the holes in the front wall. Through the aligned holes of the front wall and partition wall pipes 6, closed at one end, and having external dimensions equal to the inner diameters of these holes are airtightly inserted into the box 1. One end of each pipe may abut the rear wall of the box to be closed on one end by the rear wall. The free opening of each pipe 6 outside the box is provided with an annular gum stopper 7 through which a tube 5 having a cotton tap 8 extends so that tube 5 is fixedly inserted into the pipe 6. Each tube 5 extends substantially axially of its respective pipe 6 for a substantial portion of the length of the pipe 6 and immersed in the liquid in the pipe 6. Principle:

When the chambers A and B are circulated with liquids or properly controlled different temperatures from each outside thermostat and shaken by any suitable shaking mechanism, the liquid in each of the pipes 6 may be kept at a respectively different constant temperature in proportion to the area of the pipe 6 extending into each of the chambers and immersed in the liquid circulating through the chambers A and B. Consequentially, the substance for example, the inoculated medium in the plurality of tubes 5 fixedly inserted into and immersed in the liquid in the respective pipes 6 may also be kept at respectively different constant temperatures in each tube corresponding to the temperature of the liquid in each of the pipes 6. In this way, the optimum temperature for growth of the microorganisms may be easily and promptly determined in one culturing operation by observing the growth conditions of the microorganisms in each of the different tubes after cultivation for a given time.

The instrument of the present invention may be advantageously utilized for isolation of the microorganisms having different growing process and for assay of inhibition activity of antibiotics. Further the present instrument may be effectively used for determination of the optimum temperature for enzymic and other chemical reactions.

What we claim is:
1. A temperature gradient shaking incubator which consists of a rectangular box, the front wall of which is provided with several holes at transversely equal intervals, said box being sectioned into two separate triangular chambers by a partition wall spanning two diagonally opposite corner portions of said box and having holes aligned with the holes of the front wall, pipes of substantially the same length and being closed at one end and capable of holding culture tubes being airtightly connected through the holes of said partition wall and said front wall so that a portion of each pipe extends into each of said chambers, the other end of said pipes equipped with stoppers, both side walls of the box being provided with liquid inlets and outlets respectively so that each of said chambers is adapted to have liquids of properly controlled different temperatures circulated therethrough.

2. A temperature gradient shaking incubator as set forth in claim 1 in which said rectangular box includes a rear wall, and each of said pipes at said one end connected in abutment with said rear wall of the box, whereby the said rear wall closes the said pipes at said one end.

3. A temperature gradient shaking incubator as set forth in claim 1 in which said stoppers have apertures therethrough, a culture tube extending through the apertures of each of said stoppers into the respective said pipes and extending a substantial portion of the length of said pipes.

4. A temperature gradient shaking incubator as set forth in claim 3 including liquid sealed in said pipes by said stoppers, and said culture tubes immersed in the liquid in said pipes.

References Cited

UNITED STATES PATENTS 3,002,895   10/1961   Freedman _____ 195—143

ALVIN E. TANENHOLTZ, Primary Examiner

U.S. Cl. X.R.

195—139